(12) United States Patent
Tamano et al.

(10) Patent No.: US 6,596,663 B1
(45) Date of Patent: Jul. 22, 2003

(54) CATALYST COMPOSITION

(75) Inventors: Yutaka Tamano, Tokuyama (JP); Hiroyuki Kometani, Shinnanyo (JP); Masaki Ishida, Kudamatsu (JP)

(73) Assignee: Tosoh Corporation, Yamaguchi-ken (JP)

(*) Notice: Subject to any disclaimer, the term of this patent is extended or adjusted under 35 U.S.C. 154(b) by 38 days.

(21) Appl. No.: 09/684,520

(22) Filed: Oct. 10, 2000

(30) Foreign Application Priority Data

Oct. 13, 1909 (JP) .......................................... 11-290491

(51) Int. Cl.⁷ .......................... B01J 31/02; C08G 18/18
(52) U.S. Cl. ............ 502/167; 252/182.24; 252/182.26; 528/53; 528/76; 528/85; 521/115; 521/116; 521/118; 521/129
(58) Field of Search ................. 252/182.24, 182.26; 502/167; 528/53, 85, 76; 521/115, 116, 118, 129

(56) References Cited

U.S. PATENT DOCUMENTS 4,101,462 A    7/1978  Cuscurida et al.

FOREIGN PATENT DOCUMENTS

| DE | 28 06 217 A1 | 8/1979 | |
|---|---|---|---|
| EP | 0 469 545 A2 | 2/1992 | |
| FR | 2 085 965 | 12/1971 | |
| JP | 59191743 A | * 10/1984 | ........... C08G/18/18 |
| JP | 04065416 A | * 3/1992 | ........... C08G/18/18 |

OTHER PUBLICATIONS

JP 04–65416–A English translation.*
JP 59–191743–A English translation.*

* cited by examiner

Primary Examiner—James J. Seidleck
Assistant Examiner—Melanie Bissett
(74) Attorney, Agent, or Firm—Nixon & Vanderhye

(57) ABSTRACT

A catalyst composition for the production of a polyurethane resin, which comprises an amine compound of the following formula (1):

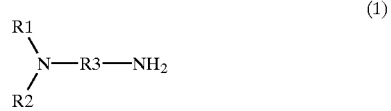

(1)

wherein each of R1 and R2 which are independent of each other, is a $C_{1-4}$ alkyl group, such alkyl groups bonded to each other directly or via a nitrogen atom or an oxygen atom to form a ring structure, a dimethylaminopropyl group or a diethylaminopropyl group, and R3 is a $C_{2-16}$ straight chain or branched chain alkylene group, and an amine compound of the following formula (2):

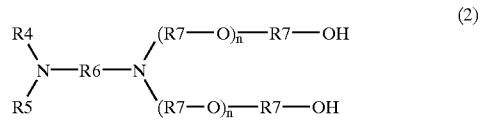

(2)

wherein each of R4 and R5 which are independent of each other, is a $C_{1-4}$ alkyl group, such alkyl groups bonded to each other directly or via a nitrogen atom or an oxygen atom to form a ring structure, a dimethylaminopropyl group or a diethylaminopropyl group, R6 is a $C_{2-16}$ straight chain or branched chain alkylene group, R7 is a $C_{2-3}$ straight chain or branched chain alkylene group, and n is an integer of from 0 to 2.

14 Claims, No Drawings

CATALYST COMPOSITION

The present invention relates to a catalyst composition for the production of a polyurethane resin of soft, hard, semihard or elastomer type, and a method for producing a polyurethane resin employing such a catalyst composition. More particularly, it relates to a catalyst composition for the production of a polyurethane resin, which does not substantially discharge a volatile amine type catalyst, and a method for producing such a polyurethane resin.

A polyurethane resin is produced by reacting a polyol with an organic polyisocyanate in the presence of a catalyst and, if necessary, a blowing agent, a surfactant, a cross-linking agent, etc. Heretofore, it has been known to employ various metal compounds or tertiary amine compounds as catalysts for the production of such polyurethane resins. These catalysts are industrially used alone or in combination.

The tertiary amine compounds are particularly excellent in the productivity and the moldability and thus widely used as tertiary amine catalysts for the production of polyurethane resins. They include, for example, conventional compounds such as triethylenediamine, N,N,N',N'-tetramethyl-1,6-hexanediamine, bis(2-dimethylaminoethyl)ether, N,N,N',N'',N''-pentamethyldiethylenetriamine, N-methylmorpholine, N-ethylmorpholine and N,N-dimethylethanolamine. Metal catalysts tend to be poor in the productivity and moldability, and in most cases, they are used in combination with tertiary amine catalysts, and they are rarely employed alone.

However, the above-mentioned tertiary amine catalysts will remain in a free form in the polyurethane resin products and will gradually be discharged as volatile amines, whereby various problems will be brought about. For example, a volatile amine discharged from a polyurethane foam product in the interior of an automobile creates an odor problem. Further, in recent years, there has been a so-called fogging problem, such that a volatile component in a polyurethane foam will deposit on a window glass of an automobile thereby to bring about fogging of the window glass and thereby to reduce the commercial value. In addition to such problems, there is a pollution problem such that a volatile amine discharged from such a polyurethane product will pollute other materials.

As a method for solving such problems, it has been proposed to employ an amine catalyst having in its molecule, primary and secondary amino groups or a hydroxy alkyl group which is capable of reacting with an organic polyisocyanate (JP-B-57-14762, JP-B-61-31727), to employ a carbonate of a primary amine (JP-A-59-191743) or to employ an amine catalyst having a hydroxyl group and a carbonate of a primary amine in combination (JP-A-4-65416). It is said that by these methods, the above-mentioned problems can be avoided, since the amine catalyst employed will be fixed in the polyurethane resin skeletal structure in the form as reacted with an organic polyisocyanate.

However, even if such an amine catalyst having a reactive group, is employed, the above problems cannot be solved completely. An amine catalyst having a reactive group usually has a drawback that the catalytic activity gradually decreases, as it is reacted with an organic polyisocyanate in the process for forming a polyurethane and will be fixed in the polyurethane resin. Particularly, an amine catalyst having primary and secondary amino groups, tends to start reacting with an organic polyisocyanate from the initial stage in the process for forming a polyurethane and will be fixed in the polyurethane resin, whereby the decrease of the catalytic activity will be substantial, and curing of the polyurethane resin tends to be inadequate, thereby to bring about a decrease in the productivity. Whereas, by the method of employing a carbonate of a primary amine as the catalyst, the curing deficiency of the resin may be overcome by the block effects of the carbonate, but the catalyst is required to be used in a large amount, and further, a volatile amine is likely to be discharged, probably because the fixing in the polyurethane resin is insufficient.

Further, among these amine catalysts having reactive groups, there are some which may be once fixed in the polyurethane resin skeletons as reacted with organic polyisocyanates, but will be discharged as free amine catalysts when the polyurethane products are brought to a high temperature to bring the decomposition of bonds. Further, another drawback of the amine catalysts having such reactive groups is that the mechanical properties of the resulting polyurethane products are likely to deteriorate.

Metal catalysts other than the amine catalysts, such as organic tin compounds, will not bring about the above problems, but by their single use, the productivity, the physical properties and the moldability tend to be poor, and further, an environmental problem due to tin has been pointed out.

The present invention has been made in view of the above problems, and its object is to provide a production method whereby a polyurethane resin which is free from generation of a volatile amine and which undergoes no substantial deterioration of the physical properties, can be obtained with good productivity and moldability, and a catalyst composition to be used for the method.

The present inventors have conducted an extensive study to solve the above problems. As a result, they have found that by using an amine compound containing at least one amino group and at least one tertiary amino group in its molecule and a tertiary amine compound having at least two hydroxyalkyl groups in its molecule in combination, it is possible to obtain a polyurethane resin which is substantially free from a volatile amine, without no substantial deterioration of the physical properties and with good moldability and productivity. The present invention has been accomplished on the basis of this discovery.

Namely, the present invention provides a catalyst composition for the production of a polyurethane resin, which comprises an amine compound of the following formula (1):

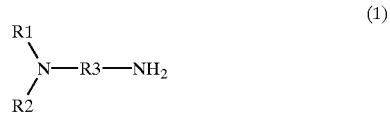

wherein each of R1 and R2 which are independent of each other, is a $C_{1-4}$ alkyl group, such alkyl groups bonded to each other directly or via a nitrogen atom or an oxygen atom to form a ring structure, a dimethylaminopropyl group or a diethylaminopropyl group, and R3 is a $C_{2-16}$ straight chain or branched chain alkylene group, and an amine compound of the following formula (2):

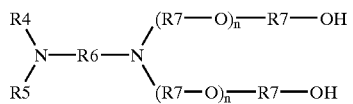

(2)

wherein each of R4 and R5 which are independent of each other, is a $C_{1-4}$ alkyl group, such alkyl groups bonded to each other directly or via a nitrogen atom or an oxygen atom to form a ring structure, a dimethylaminopropyl group or a diethylaminopropyl group, R6 is a $C_{2-16}$ straight chain or branched chain alkylene group, R7 is a $C_{2-3}$ straight chain or branched chain alkylene group, and n is an integer of from 0 to 2, and a method for producing a polyurethane resin, wherein such a catalyst composition is employed.

Now, the present invention will be described in detail with reference to the preferred embodiments.

The catalyst composition for the production of a polyurethane resin of the present invention comprises an amine compound of the above formula (1) and an amine compound of the above formula (2).

The amine compound of the above formula (1) is one having at least one amino group and at least one tertiary amino group in its molecule. Specifically, it includes, for example, N,N-dimethylethylenediamine, N,N-dimethylpropanediamine, N,N-dimethylbutanediamine, N,N-dimethylpentanediamine, N,N-dimethylneopentanediamine, N,N-dimethylhexanediamine, N,N-dimethylhexadecyldiamine, N,N-diethylethylenediamine, N,N-diethylpropanediamine, 4-amino-1-diethylaminopentane, N,N-diethylhexanediamine, N-(aminoethyl)piperidine, N-(aminoethyl)-N'-methylpiperazine, N-(aminoethyl)morpholine, N-(aminopropyl)piperidine, N-(aminopropyl)-N'-methylpiperazine, N-(aminopropyl)morpholine, N,N-bis(dimethylaminopropyl)ethylenediamine, N,N-bis(dimethylaminopropyl)propanediamine, and N,N-bis(diethylaminopropyl)propanediamine. Among these, N,N-dimethylethylenediamine, N,N-dimethylpropanediamine, N,N-dimethylbutanediamine, N,N-dimethylpentanediamine, N,N-dimethylneopentanediamine, N,N-dimethylhexanediamine, N-(aminoethyl)piperidine, 1-(aminopropyl)-2-methylimidazole, N,N-bis(dimethylaminopropyl)ethylenediamine and N,N-bis(dimethylaminopropyl)propanediamine have high catalytic activities and are thus more preferred.

The amine compound of the above formula (2) is a tertiary amine compound having at least two hydroxyalkyl groups and can be obtained, for example, by having from 2 to 6 mols of ethylene oxide or propylene oxide addition-reacted to the primary amino group of the amine compound of the above formula (1). The addition molar amount of ethylene oxide or propylene oxide is particularly preferably 2.0 mols from the viewpoint of the catalytic activity. Specifically, such an amine compound includes, for example, N,N-dimethyl-N',N'-bis(hydroxyethyl)ethylenediamine, N,N-dimethyl-N',N'-bis(hydroxyethyl)propanediamine, N,N-dimethyl-N',N'-bis(hydroxyethyl)neopentanediamine, N,N-dimethyl-N',N'-bis(hydroxyethyl)hexanediamine, N,N-dimethyl-N',N'-bis(hydroxyethyl)hexadecyldiamine, N,N-diethyl-N',N'-bis(hydroxyethyl)ethylenediamine, N,N-diethyl-N',N'-bis(hydroxyethyl)propanediamine, 4-bis(hydroxyethyl)amino-1-diethylaminopentane, N,N-diethyl-N',N'-bis(hydroxyethyl)hexanediamine, N-(N,N-bis(hydroxyethyl)aminoethyl)piperidine, N-(N,N-bis(hydroxyethyl)aminoethyl)-N'-methylpiperazine, N-(N,N-bis(hydroxyethyl)aminopropyl)piperidine, N-(N,N-bis(hydroxyethyl)aminopropyl)-N'-methylpiperazine, N,N-bis(dimethylaminopropyl)-N',N'-bis(hydroxyethyl)ethylenediamine, N,N-bis(dimethylaminopropyl)-N',N'-bis(hydroxyethyl)propanediamine, N,N-bis(diethylaminopropyl)-N',N'-bis(hydroxyethyl)propanediamine, N,N-dimethyl-N',N'-bis(hydroxypropyl)ethylenediamine, N,N-dimethyl-N',N'-bis(hydroxypropyl)propanediamine, N,N-dimethyl-N',N'-bis(hydroxypropyl)neopentanediamine, N,N-dimethyl-N',N'-bis(hydroxypropyl)hexanediamine, N,N-dimethyl-N',N'-bis(hydroxypropyl)hexadecyldiamine, N,N-diethyl-N',N'-bis(hydroxypropyl)ethylenediamine, N,N-diethyl-N',N'-bis(hydroxypropyl)propanediamine, 4-bis(hydroxypropyl)amino-1-diethylaminopentane, N,N-diethyl-N',N'-bis(hydroxypropyl)hexanediamine, N-(N,N-bis(hydroxypropyl)aminoethyl)piperidine, N-(N,N-bis(hydroxypropyl)aminoethyl)-N'-methylpiperazine, N-(N,N-bis(hydroxypropyl)aminopropyl)piperidine, N-(N,N-bis(hydroxypropyl)aminopropyl)-N'-methylpiperazine, N,N-bis(dimethylaminopropyl)-N',N'- bis(hydroxypropyl)ethylenediamine, N,N-bis(dimethylaminopropyl)-N',N'-bis(hydroxypropyl)propanediamine, and N,N-bis(diethylaminopropyl)-N',N'-bis(hydroxypropyl)propanediamine. Among these, N,N-dimethyl-N',N'-bis(hydroxyethyl)ethylenediamine, N,N-dimethyl-N',N'-bis(hydroxyethyl)propanediamine, N,N-dimethyl-N',N'-bis(hydroxyethyl)neopentanediamine, N,N-dimethyl-N',N'-bis(hydroxyethyl)hexanediamine, N-(N,N-bis(hydroxyethyl)aminoethyl)piperidine, N,N-bis(dimethylaminopropyl)-N',N'-bis(hydroxyethyl)ethylenediamine, N,N-bis(dimethylaminopropyl)-N',N'-bis(hydroxyethyl)propanediamine, N,N-dimethyl-N',N'-bis(hydroxypropyl)ethylenediamine, N,N-dimethyl-N',N'-bis(hydroxypropyl)propanediamine, N,N-dimethyl-N',N'-bis(hydroxypropyl)neopentanediamine, N,N-dimethyl-N',N'-bis(hydroxypropyl)hexanediamine, N-(N,N-bis(hydroxyethyl)aminoethyl)piperidine, N,N-bis(dimethylaminopropyl)-N',N'-bis(hydroxyethyl)ethylenediamine and N,N-bis(dimethylaminopropyl)-N',N'-bis(hydroxyethyl)propanediamine have high catalytic activities and thus are more preferred.

In the catalyst composition of the present invention, the mixing ratio of the amine compound of the above formula (1) to the amine compound of the above formula (2) is usually within a range of 20 to 95/80 to 5 (wt %), preferably within a range of from 30 to 90/70 to 10 (wt %). If the mixing ratio is outside such a range, e.g. if the compound of the above formula (1) exceeds 95 wt %, the productivity of the polyurethane resin tends to remarkably deteriorate, and on the other hand, if the compound of the above formula (2) exceeds 80 wt %, the catalytic activity tends to be low, and it will be required to increase the amount of the catalysts to be used. Further, in some cases, the amount of a volatile amine increases. Further, also in the case of a soft foam product, it may happen that the closed cell nature of foam cells tends to be strong, whereby the moldability tends to deteriorate, such that after removing from the mold, it undergoes shrinkage or deformation. Namely, even if the compound of the above formula (1) and the compound of the above formula (2) are independently used alone for the production of a polyurethane resin, the amount of a volatile amine tends to increase, or the productivity or moldability tends to be problematic, whereby the effects of the present invention can not be accomplished. The effects of the present invention can be accomplished only by the synergistic effects by the combined use of the two types of the amine compounds.

The amine compound of the above formula (1) to be used in the catalyst composition of the present invention, can be produced by a conventional method. For example, N,N-dimethylpropanediamine, N,N-diethylpropanediamine or the like can be obtained by a hydrogenation reaction of a dialkylaminopropionitrile which is obtained by a reaction of dimethylamine, diethylamine or the like with acrylonitrile. Further, bis(dimethylaminopropyl)propanediamine can be obtained by a hydrogenation reaction of a reaction product of acrylonitrile with bis(dimethylaminopropyl)amine which is a by-product from the above mentioned hydrogenation reaction of a dialkylaminopropionitrile. Whereas, the amine compound of the above formula (2) can be obtained by an addition reaction of ethylene oxide or propylene oxide to the compound of the above formula (1), as mentioned above.

For the production of a polyurethane resin, the catalyst composition of the present invention is used usually in an amount of from 0.01 to 10 parts by weight, preferably from 0.05 to 5 parts by weight, per 100 parts by weight of the polyol to be used. If the catalyst is used in a large amount, the productivity of the polyurethane resin will improve, but the amount of a volatile amine also increases, such being undesirable.

The catalyst composition of the present invention will react with a polyisocyanate which is a material for a polyurethane resin, whereby it will be fixed in a polyurethane resin skeleton. Further, the fixed catalyst of the present invention will not be decomposed even when exposed to a high temperature. Thus, the catalyst composition of the present invention will not be present in the form of a free amine in the polyurethane resin, and accordingly, no volatile amine will be discharged. Namely, with the polyurethane resin product produced by using the catalyst composition of the present invention, it is possible to prevent the above-mentioned various problems, such as an odor due to a volatile amine, the fogging, etc. Further, when the catalyst of the present invention is used for the production of a polyurethane resin, a polyurethane foam product or the like exhibits excellent moldability such as elimination of the cell roughing at the foam surface portion, and curing of the resin will be quickened to improve the productivity.

The method for producing a polyurethane resin employing the catalyst composition of the present invention is a method for obtaining a polyurethane resin product by reacting a polyol with an organic polyisocyanate in the presence of the amine catalyst and, if necessary, a blowing agent, a surfactant or a cross-linking agent. The product may, for example, be a soft polyurethane foam, a semihard polyurethane foam or a hard polyurethane foam, to be produced by means of a blowing agent, or an elastomer product to be produced without using a blowing agent. Among such products, the catalyst composition of the present invention is applicable preferably to a soft polyurethane foam, a semihard polyurethane foam or a hard polyurethane foam, to be produced by means of a blowing agent, particularly preferably, to a soft polyurethane foam, whereby a volatile amine catalyst is likely to be discharged.

In the polyurethane resin produced by the method of the present invention, the amount of a volatile amine catalyst is not more than 1 μm per g of the polyurethane resin. Here, the amount of a volatile amine catalyst in the present invention means the total amount of the amine catalyst generated in a gas form from the polyurethane resin when the polyurethane resin is heated at 100° C. for 48 hours.

The polyol to be used in the method for the production of a polyurethane resin of the present invention, includes, for example, conventional polyether polyols, polyester polyols, polymer polyols and further flame resisting polyols such as phosphorus-containing polyols or halogen-containing polyols. These polyols may be used alone or in a proper combination as mixed.

The polyether polyols can be produced, for example, by an addition reaction of an alkylene oxide such as ethylene oxide or propylene oxide to a starting material which is a compound having at least two active hydrogen groups, such as a polyhydric alcohol such as ethylene glycol, propylene glycol, glycerol, trimethylol propane or pentaerythritol, an amine such as ethylenediamine, or an alkanolamine such as ethanolamine or diethanolamlne, for example, by a method disclosed in Polyurethane Handbook (edited by Gunter Oertel, 1985), p.42–53.

The polyester polyols may, for example, be those obtainable by the reaction of a dibasic acid with glycol, further a waste during the production of nylon as disclosed in "Polyurethane Resin Handbook" (edited by Keiji Iwata, first edition published in 1987), p.117, TMP, a waste of pentaerythritol, a waste of a phthalate type polyester, and polyester polyols derived from treatments of such waste products.

The polymer polyols may, for example, be polymer polyols obtained by reacting the above-mentioned polyether polyols with an ethylenically unsaturated monomer such as butadiene, acrylonitrile or styrene, in the presence of a radical polymerization catalyst.

The flame resisting polyols may, for example, be phosphorus-containing polyols obtainable by adding an alkylene oxide to a phosphoric acid compound, halogen-containing polyols obtainable by ring opening polymerization of epichlorohydrin or trichlorobutylene oxide, and phenol polyols.

These polyols may have molecular weights of from 62 to 15,000. For soft polyurethane foams, those having molecular weights of from 1,000 to 15,000 may be used. Preferred are polyether polyols and polymer polyols having molecular weights of from 3,000 to 15,000. More preferred are soft polyurethane foams prepared by using polyether polyols and polymer polyols in combination.

The organic polyisocyanate to be used in the present invention may be a known polyisocyanate, for example, an aromatic polyisocyanate such as toluene diisocyanate (TDI), diphenylmethane diisocyanate (MDI), naphthylene diisocyanate or xylylene diisocyanate, an aliphatic polyisocyanate, an aliphatic polyisocyanate such as hexamethylene diisocyanate, an alicyclic polyisocyanate such as dicyclohexyl diisocyanate or isophorone diisocyanate, or a mixture thereof. As TDI or its derivative, a mixture of 2,4-toluene diisocyanate and 2,6-toluene diisocyanate, or a terminal isocyanate prepolymer derivative of TDI, may be mentioned. As MDI or its derivative, a mixture of MDI and its polymer i.e. a polyphenyl-polymethylene diisocyanate, and/or a terminal isocyanate group-containing diphenylmethane diisocyanate derivative, may be mentioned. Among such organic polyisocyanates, TDI and MDI are preferably employed. For soft polyurethane foams, TDI, MDI or its combined system is preferably employed.

The ratio of such an organic polyisocyanate to the polyol is not particularly limited, but, as represented by an isocyanate index (i.e. isocyanate groups/active hydrogen groups reactive with isocyanate groups), it is usually within a range of from 60 to 130 for the production of a soft foam or a semihard foam and usually within a range of from 60 to 400 for the production of a hard foam or an urethane elastomer.

The catalyst to be used for the method for the production of a polyurethane of the present invention, is the above-mentioned catalyst of the present invention. However, other catalysts may be used in combination within a range not to depart from the present invention. As such other catalysts, for example, conventional organic metal catalysts, tertiary amines or quaternary ammonium salts may be mentioned.

The organic metal catalysts include, for example, stannous diacetate, stannous dioctoate, stannous dioleate, stannous dilaurate, dibutyltin oxide, dibutyltin diacetate, dibutyltin dilaurate, dibutyltin dichloride, dioctyltin dilaurate, lead octanoate, lead naphthenate, nickel naphthenate and cobalt naphthenate.

The tertiary amines may be conventional ones, for example, tertiary amine compounds such as N,N,N',N'-tetramethylethylenediamine, N,N,N',N',-tetramethylpropylenediamine, N,N,N',N"",-pentamethyldiethylenetriamine, N,N,N',N"",-pentamethyl-(3-aminopropyl)ethylenediamine, N,N,N',N"",-pentamethyldipropylenetriamine, N,N,N',N'-tetramethylguanidine, 1,3,5-tris(N,N-dimethylaminopropyl) hexahydro-S-triazine, 1,8-diazabicyclo[5.4.0]undecene-7, triethylenediamine, N,N,N',N'-tetramethylhexamethylenediamine, N-methyl-N'-(2-dimethylaminoethyl)piperazine, N,N'-dimethylpiperazine, dimethylcyclohexylamine, N-methylmorpholine, N-ethylmorpholine, bis(2-dimethylaminoethyl)ether, 1-methylimidazole, 1,2-dimethylimidazole, 1-isobutyl-2-methylimidazole and 1-dimethylaminopropylimidazole. Further, tertiary amine compounds having reactive groups other than the present invention may also be used, such as dimethylethanolamine, dimethylisopropanolamine, N,N-dimethylhexanolamine, dimethylaminoethoxyethanol, N,N-dimethyl-N'-(2-hydroxyethyl)ethylenediamine, N,N-dimethyl-N'-(2-hydroxyethyl)propanediamine, N-methyl-N'-(2-hydroxyethyl)piperazine, bis(dimethylaminopropyl) amine, bis(dimethylaminopropyl)isopropanolamine, 1-(2-hydroxyethyl)imidazole, 1-(2-hydroxypropyl)imidazole, 1-(2-hydroxyethyl)-2-methylimidazole, 1-(2-hydroxypropyl)-2-methylimidazole and 3-quinuclidinol.

The quaternary ammonium salts include, for example, a conventional tetraalkylammonium halide such as a tetramethylammonium chloride, a tetraalkylammonium hydroxide such as tetramethylammonium hydroxide, and a tetraalkylammonium organic acid salt such as a tetramethylammonium 2-ethylhexanoate, a 2-hydroxypropyltrimethylammonium formate or a 2-hydroxypropyltrimethylammonium 2-ethylhexanoate.

The blowing agent to be used for the method for the production of a polyurethane resin of the present invention, is water and/or a low boiling point organic compound. The low boiling point organic compound may, for example, be a hydrocarbon compound or a halogenated hydrocarbon compound. The hydrocarbon compound may, for example, be known methane, ethane, propane, butane, pentane or hexane. The halogenated hydrocarbon may, for example, be known halogenated methane, halogenated ethanes or fluorinated hydrocarbons, such as methylene chloride, HCFC-141b, HFC-245fa or HFC-356mfc. When such blowing agents are to be used, water and a low boiling point organic compound may be used alone independently or in combination. A particularly preferred blowing agent is water. The amount may vary depending upon the density of the product, but it is usually at least 0.1 part by weight, preferably from 0.5 to 10 parts by weight, per 100 parts by weight of the polyol.

In the present invention, a surfactant may also be employed, as the case requires. As the surfactant to be used in the present invention, a conventional organic silicone type surfactant may be mentioned, and it is used usually in an amount of from 0.1 to 10 parts by weight, per 100 parts by weight of the polyol.

In the present invention, a cross-linking agent or a chain extender may be incorporated as the case requires. As the cross-liking agent or the chain extender, a polyhydric alcohol having a low molecular weight (such as ethylene glycol, 1,4-butanediol or glycerol), an aminepolyol having a low molecular weight (such as diethanolamine or triethanolamine) or a polyamine (such as ethylenediamine, xylylenediamine or methylenebis-orthochloraniline) may, for example, be mentioned. Among them, dimethanolamine or triethanolamine is preferred.

In the method of the present invention, a coloring agent, a flame retardant, an aging-preventive agent or other known additives may also be used, as the case requires. The types and the amounts of such additives may usually be within the commonly employed ranges so long as they will not depart from known manners and procedures.

The product produced by the method of the present invention can be used for various applications. A soft foam may, for example, be applied as a cushion to a bed, a carpet or a mattress. A semihard foam may be applied, for example, to an instrumental panel, a headrest or a steering wheel relating to an automobile. A hard foam may be applied, for example, to a refrigerator, a freezer or a heat-insulating building material. An elastomer product may, for example, be applied to an adhesive, a floor material or a waterproofing material.

The catalyst composition of the present invention will react with a polyisocyanate which is a starting material for a polyurethane resin and thus will be fixed in the polyurethane resin skeleton. Further, the fixed catalyst of the present invention will not be decomposed even when exposed to a high temperature. Therefore, the catalyst composition of the present invention will not be present as a free amine in the polyurethane resin, whereby a volatile amine will not be discharged. Namely, with a polyurethane resin product obtained by means of the catalyst composition of the present invention, it is possible to prevent various problems of the prior art, such as an odor due to a volatile amine and fogging. Further, when the catalyst of the present invention is used for the production of a polyurethane resin, excellent moldability such as elimination of cell roughing at the surface portion of a foam with respect to a polyurethane foam product or the like, is obtainable, and curing of the resin will be accelerated to improve the productivity.

Now, the present invention will be described in further detail with reference to Examples and Comparative Examples. However, it should be understood that the present invention is by no means restricted to such specific Examples.

EXAMPLES 1 to 5 and Comparative Examples 1 to 9

Examples are shown in which soft highly elastic polyurethane foams were produced by means of the catalyst compositions of the present invention and catalysts of Comparative Examples.

N,N-dimethylethylenediamine (DMAEA) or N,N-dimethylpropanediamine (DMAPA) and N,N-dimethyl-N', N'-bis(hydroxyethyl)propanediamine (DMAPA2EO) or N,N-dimethyl-N',N'-bis(hydroxypropyl)propanediamine (DMAPA2PO) were mixed in the mixing ratio shown in Table 1. In this manner, catalyst compositions C-1 to C-5 of the present invention were prepared.

TABLE 1

| Catalyst No. | Mixing ratio of catalysts (weight ratio) |
|---|---|
| C-1 | DMAPA/DMAPA2EO = 50/50 |
| C-2 | DMAPA/DMAPA2PO = 50/50 |
| C-3 | DMAPA/DMAPA2PO = 85/15 |
| C-4 | DMAEA/DMAPA2EO = 30/70 |
| C-5 | DMAEA/DMAPA2PO = 50/50 |

Polyols, water, cross-linking agents and foam stabilizers were mixed in the mixing ratio shown in Table 2 to obtain premix A.

TABLE 2

| | Parts by weight (pbw) |
|---|---|
| Polyol A[1] | 60 |
| Polyol B[2] | 40 |
| Diethanolamine[3] | 1.0 |
| Triethanolamine[4] | 2.0 |
| Water | 3.20 |
| Foam stabilizer A[5] | 1.0 |
| Foam stabilizer B[6] | 1.0 |
| TM80[7] | Isocyanate INDEX 105[8] |

[1]KC-211, polyether polyol, manufactured by Sanyo Kasei K.K. (OH value = 30 mgKOH/g)
[2]FA-728R, polyether polyol, manufactured by Sanyo Kasei K.K. (OH value = 27.5 mgKOH/g)
[3]Cross-linking agent (manufactured by Kanto Kagaku K.K.)
[4]Cross-linking agent (manufactured by Kanto Kagaku K.K.)
[5]Silicone type surfactant, manufactured by Toray Silicone K.K.)
[6]Silicone type surfactant, manufactured by Nippon UNICAR CO LTD)
[7]A blend product of TDI:T-80 (manufactured by Nippon Polyurethane K.K.) and MDI:MR200 (manufactured by Nippon Polyurethane K.K.) in a ratio of 80/20
[8]INDEX = (mols of NCO groups/mols of OH groups) × 100

86.6 g of premix A was taken into a 300 ml polyethylene cup, and one of the catalyst compositions C-1 to C-5 of the present invention and the catalysts of Comparative Examples, was added in an amount such that the reactivity would be 60 seconds as represented by the following gel time, and the temperature was adjusted to 20° C. A polyisocyanate liquid (TM80) having the temperature adjusted to 20° C. in a separate container, was put into the cup of premix A in an amount such that the isocyanate index (molar ratio of isocyanate groups/OH groups×100) would be 105, and quickly stirred by a stirrer at 6,000 rpm for 5 seconds. The mixed solution obtained by stirring was transferred to a 2l polyethylene cup adjusted to a temperature of 50° C., whereupon the reactivity during foaming was measured. Then, the starting material scale was increased, and the mixed solution was put into a mold (made of-aluminum and having an internal size of 35×35×10 cm) adjusted to a temperature of 50° C. in the same manner, so that the total density of the foam would be 45 kg/cm$^3$, and after placing a cover, foam molding was carried out. Upon expiration of 5 minutes from the time when the mixed solution was introduced, the foam was removed from the mold. From the molded foam, the closed cell nature of the foam, the hardness during the removal of the foam from the mold, the moldability of the foam, the total density of the foam, the core density, the amount of the volatized amine catalyst and the odor of the foam, were measured and compared. The results are shown in Tables 3 and 4. The measuring methods for the respective measured items were as follows.

Measurement of the reactivity

Cream time: Foaming initiation time, the time until the foam started to rise, was visually measured.

Gel time: As the reaction proceeded, the time until the liquid substance was changed to the resin substance, was measured.

Rise time: The time until the rise of foam terminated, was measured by visual observation.

Closed cell nature of the foam

Upon expiration of 5 minutes from the time when the mixed solution was introduced, the foam was removed from the mold, and the foam was immediately pressed by a hand, and evaluation was carried out as follows. If the closed cell nature is strong, the foam has no elasticity, and the resistance received by the hand is large.

⊚: Elasticity is large.
○: Elasticity is moderate.
Δ: Elasticity is small.
X: No elasticity.

Hardness of the foam at the time of removal from the mold

Immediately after the evaluation of the closed cell nature of the foam, the 75% compression hardness of the foam was measured twice by means of a disk having a diameter of 20 cm by a tensilon. The second hardness was taken as the hardness at the time of removal from the mold. If the hardness at the time of removal of the mold is high, removal from the mold can be facilitated, which contributes to the productivity of the foam.

Moldability of the foam

The cellular roughing at the surface portion of the molded foam was visually inspected and evaluated as the moldability as follows.

⊚: No cell roughing observed.
○: Cell roughing partially observed.
Δ: Cell roughing observed over about one half of the surface portion.
X: Cell roughing observed over the entire area of the surface portion.

Foam core density

The center portion of the molded foam was cut into a size of 20×20×5 cm, and the size and the weight were accurately measured, whereby the core density was calculated.

Amount of evaporated amine catalyst

The quantitative analysis was carried out in accordance with a method of DIN75201-G wherein the amount of the amine catalyst evaporated from the foam and condensed, was measured. Namely, fire sheets of foam having a size of 5×5×1 cm were cut out from the foam, of which the foam core density was measured, and put into a flat bottomed separable flask of 500 ml, which was covered with an aluminum foil. Then, an upper cover of a separable flask modified so that cooling water can be circulated in a void space, was put on the 500 ml flat bottomed separable flask and fixed by clamping. This container was immersed in an oil bath of 100° C. for 48 hours. After the 48 hours, the amine catalyst deposited on the aluminum foil was collected by methanol and quantitatively analyzed by gas chromatography. The quantified value was represented by $\mu$ g of the amine catalyst per g of the foam.

Odor of the foam

From the foam, of which the foam core density was measured, a foam having a size of 5×5×5 cm was cut out and put into a mayonnaise bottle, and a cover was put thereon. Then, the odor of the foam was smelled by ten monitors, and the intensity of the odor was measured.

⊚: No substantial odor smelled.
○: Slight odor smelled.
Δ: Odor distinctly smelled.
X: Strong odor smelled.

TABLE 3

|  | Examples | | | | | Comparative Examples | |
|---|---|---|---|---|---|---|---|
|  | 1 | 2 | 3 | 4 | 5 | 1 | 2 |
| Amount of catalyst (pbw) | | | | | | | |
| C-1 | 1.03 | | | | | | |
| C-2 | | 1.07 | | | | | |
| C-3 | | | 0.95 | | | | |
| C-4 | | | | 1.2 | | | |
| C-5 | | | | | 1.27 | | |
| L33[9] | | | | | | 0.88 | |
| TMAEEA[10] | | | | | | | 0.91 |
| Reactivity (sec) | | | | | | | |
| Cream time | 11 | 11 | 10 | 11 | 10 | 12 | 10 |
| Gel time | 60 | 60 | 60 | 60 | 60 | 60 | 60 |
| Rise time | 78 | 77 | 75 | 76 | 78 | 81 | 73 |
| Physical properties of the foam | | | | | | | |
| Mold total density (kg/m$^3$) | 44.9 | 44.8 | 44.7 | 44.5 | 45 | 44.7 | 44.6 |
| Mold core density (kg/m$^3$) | 43.1 | 43.1 | 43.7 | 43 | 43.1 | 42.5 | 43.9 |
| Amount of evaporated amine catalyst ($\mu$g/g) | Less than 1 | Less than 1 | Less than 1 | Less than 1 | Less than 1 | 1140 | 1850 |
| Closed cell nature of foam | ○ | ○ | ⊚ | ○ | ⊚ | x | ○ |
| Hardness of foam at the time of removal from the mold (kgf) | 38 | 40 | 35 | 39 | 38 | 40 | 34 |
| Moldability of foam | ⊚ | ⊚ | ○ | ○ | ○ | x | x |
| Odor of foam | ⊚ | ⊚ | ⊚ | ⊚ | ⊚ | Δ | x |

[9] A dipropylene glycol solution containing 33.3% of triethylene diamine (manufactured by TOSOH CORPORATION)
[10] N,N,N'-trimethyl-N'-(2-hydroxyethyl)ethylenediamine (manufactured by TOSOH CORPORATION)

TABLE 4

|  | Comparative Examples | | | | | | | |
|---|---|---|---|---|---|---|---|---|
|  | 3 | 4 | 5 | 6 | 7 | 8 | 9 | 10 |
| Amount of catalyst (pbw) | | | | | | | | |
| DMAEA | 1.16 | | | | | | | |
| DMAPA | | 0.87 | | | | | | |
| DMAPA2EO | | | 1.35 | | | | | |
| DMAPA2PO | | | | 1.71 | | | 0.75 | 1.14 |
| BDA[11] | | | | | 1.15 | | | |
| DMAPA carbonate[12] | | | | | | 2.86 | 1.3 | 0.70 |
| Reactivity (sec) | | | | | | | | |
| Cream time | 9 | 11 | 11 | 11 | 10 | 9 | 10 | 11 |
| Gel time | 60 | 60 | 60 | 60 | 60 | 60 | 60 | 60 |
| Rise time | 77 | 72 | 84 | 84 | 85 | 76 | 75 | 78 |
| Physical properties of the foam | | | | | | | | |
| Mold total density (kg/m$^3$) | 44.2 | 45 | 45.3 | 45.4 | 45.3 | 44.9 | 44.2 | 44.6 |
| Mold core density (kg/m$^3$) | 43.2 | 44 | 41.7 | 41.9 | 43.6 | 41.5 | 41.9 | 41.7 |
| Amount of evaporated amine catalyst ($\mu$g/g) | 5 | 3 | 6 | 9 | 2216 | 980 | 366 | 62 |
| Closed cell nature of foam | ⊚ | ⊚ | x | x | ○ | x | x | x |
| Hardness of foam at the time of removal from the mold (kgf) | 19 | 23 | 38 | 43 | 35 | 41 | 40 | 36 |
| Moldability of foam | Δ | ○ | ○ | ○ | ○ | Δ | ○ | ○ |
| Odor of foam | ○ | ⊚ | ○ | ○ | x | Δ | ○ | ○ |

[11] Bis(dimethylaminopropyl)amine, Polycat-15 (manufactured by Air Products and Chemicals Company).
[12] Prepared by blowing carbondioxide gas into an aqueous solution of DMAPA. An aqueous solution containing 70% of DMAPA carbonate. When this catalyst was used for evaluation of foaming, the formulation as identified in Table 2 was adjusted by reducing the amount of water.

As is evident from Examples 1 to 5, polyurethane foams obtained by using the catalyst compositions of the present invention, have a volatile amine catalyst content of not more than 1 $\mu$g/g and thus will discharge substantially no amine catalyst, whereby the foams have no odor. Further, the moldabilities of the foams are good, and further, the hardness of the foams at the time of removal from the mold is high, and the foam products can be taken out from the molds in a short period of time, which contributes to the productivity of the foams.

Whereas, in Comparative Examples 1 to 9, volatile amine catalysts will be discharged in a substantial amount from the foams, whereby the foams have strong odors.

Comparative Example 1 is an example for a tertiary amine catalyst having no reactive group in its molecule, whereby a volatile amine catalyst is discharged in a large amount from the foam.

Comparative Example 2 is an example for an amine catalyst having a hydroxyethyl group in its molecule, whereby a volatile amine catalyst is discharged in a large amount from the foam.

Comparative Examples 3 to 4 are examples for single use of the amine compounds used in the catalyst compositions of the present invention. By the amine catalyst having a primary amino group in its molecule in Comparative Example 3 or 4, the hardness of the foam at the time of removal from the mold is low, and it is impossible to take out the foam product from the mold in a short period of time, whereby the productivity of the foam is poor. By single use of an amine catalyst having two hydroxyalkyl groups in its molecule in Comparative Example 5 or 6, the catalyst activity is low, and the amount of the catalyst required increases, and a volatile amine catalyst is discharged from the foam although the amount is small. Further, the closed cell nature of the foam is strong.

By the amine catalyst having a secondary amino group in its molecule in Comparative Example 7, a volatile amine catalyst is discharged in a large amount from the foam.

Comparative Example 8 is an example for a carbonate of the amine catalyst having a primary amino group, wherein the catalyst activity is low, and the amount of the catalyst required increases, and a volatile amine catalyst is discharged in a large amount from the foam.

Comparative Example 9 is an example for combined use of a carbonate of an amine catalyst having a primary amino group and an amine catalyst having two hydroxyalkyl groups in its molecule, wherein the amount of the catalyst required increases, and a volatile amine catalyst is discharged in a large amount from the foam.

Comparative Example 10 is an example for the same combination of the amine catalysts as in Comparative Example 9, but the amount of the amine catalyst discharged from the foam is not reduced to such a level as attainable by the catalyst composition of the present invention. Further, the problem that the closed cell nature of the foam is high, has not yet been solved.

The entire disclosure of Japanese Patent Application No. 11-290491 filed on Oct. 13, 1999 including specification, claims, drawings and summary are incorporated herein by reference in its entirety.

What is claimed is:

1. A catalyst composition for the production of a polyurethane resin, which comprises an amine compound of the following formula (1):

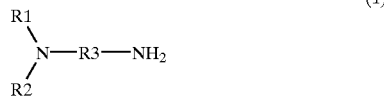

(1)

wherein each of R1 and R2 which are independent of each other, is a $C_{1-4}$ alkyl group, such alkyl groups bonded to each other directly or via a nitrogen atom or an oxygen atom to form a ring structure, a dimethylaminopropyl group or a diethylaminopropyl group, and R3 is a $C_{2-16}$ straight chain or branched chain alkylene group, and an amine compound of the following formula (2):

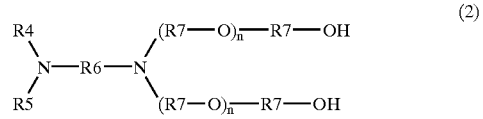

(2)

wherein each of R4 and R5 which are independent of each other, is a $C_{1-4}$ alkyl group, such alkyl groups bonded to each other directly or via a nitrogen atom or an oxygen atom to form a ring structure, a dimethylaminopropyl group or a diethylaminopropyl group, R6 is a $C_{2-16}$ straight chain or branched chain alkylene group, R7 is a $C_{2-3}$ straight chain or branched chain alkylene group, and n is an integer of from 0 to 2 wherein the amount of volatile catalyst is not more than 1 µg per gram of the polyurethane resin produced by the composition.

2. The catalyst composition according to claim 1, wherein the mixing ratio of the compound of the formula (1) to the compound of the formula (2) is within a range of 20 to 95/80 to 5 (wt %).

3. The catalyst composition according to claim 1, wherein the compound of the formula (1) is selected from the group consisting of N,N-dimethylethylenediamine, N,N-dimethylpropanediamine, N,N-dimethylbutanediamine, N,N-dimethylpentanediamine, N,N-dimethylneopentanediamine, N,N-dimethylhexanediamine, N,N-dimethylhexadecyldiamine, N,N-diethylethylenediamine, N,N-diethylpropanediamine, 4-amino-1-diethylaminopentane, N,N-diethylhexanediamine, N-(aminoethyl)piperidine, N-(aminoethyl)-N'-methylpiperazine, N-(aminoethyl)morpholine, N-(aminopropyl)piperidine, N-(aminopropyl)-N'-methylpiperazine, N-(aminopropyl)morpholine, N,N-bis(dimethylaminopropyl)ethylenediamine, N,N-bis(dimethylaminopropyl)propanediamine, and N,N-bis(diethylaminopropyl)propanediamine, and the compound of the formula (2) is selected from the group consisting of N,N-dimethyl-N',N'-bis(hydroxyethyl)ethylenediamine, N,N-dimethyl-N',N'-bis(hydroxyethyl)propanediamine, N,N-dimethyl-N',N'-bis(hydroxyethyl)neopentanediamine, N,N-dimethyl-N',N'-bis(hydroxyethyl)hexanediamine, N,N-dimethyl-N',N'-bis(hydroxyethyl)hexadecyldiamine, N,N-diethyl-N',N'-bis(hydroxyethyl)ethylenediamine, N,N-diethyl-N',N'-bis(hydroxyethyl)propanediamine, 4-bis(hydroxyethyl)amino-1-diethylaminopentane, N,N-diethyl-N',N'-bis(hydroxyethyl)hexanediamine, N-(N,N-bis(hydroxyethyl)aminoethyl)piperidine, N-(N,N-bis(hydroxyethyl)aminoethyl)-N'-methylpiperazine, N-(N,N-bis(hydroxyethyl)aminopropyl)piperidine, N-(N,N-bis(hydroxyethyl)aminopropyl)-N'-methylpiperazine, N,N-bis(dimethylaminopropyl)-N',N'-bis(hydroxyethyl)ethylenediamine, N,N-bis(dimethylaminopropyl)-N',N'-bis(hydroxyethyl)propanediamine, N,N-bis(diethylaminopropyl)-N',N'-bis(hydroxyethyl)propanediamine, N,N-dimethyl-N',N'-bis(hydroxypropyl)ethylenediamine, N,N-dimethyl-N',N'-bis(hydroxypropyl)propanediamine, N,N-dimethyl-N',N'-bis(hydroxypropyl)neopentanediamine, N,N-dimethyl-N',N'-bis(hydroxypropyl)hexanediamine, N,N-dimethyl-N',N'-bis(hydroxypropyl)hexadecyldiamine, N,N-diethyl-N',N'-bis(hydroxypropyl)ethylenediamine, N,N-diethyl-N',N'-bis(hydroxypropyl)propanediamine, 4-bis(hydroxypropyl)amino-1-diethylaminopentane, N,N-diethyl-N',N'-bis(hydroxypropyl)hexanediamine, N-(N,N-bis(hydroxypropyl)aminoethyl)piperidine, N-(N, N-bis(hydroxypropyl)aminoethyl)-N'-methylpiperazine, N-(N,N-bis(hydroxypropyl)aminopropyl)piperidine, N-(N,N-bis(hydroxypropyl)aminopropyl)-N'-methylpiperazine, N,N-bis(dimethylaminopropyl)-N',N'-bis(hydroxypropyl)ethylenediamine, N,N-bis(dimethylaminopropyl)-N',N'-bis(hydroxypropyl)propanediamine, and N,N-bis(diethylaminopropyl)-N',N'-bis(hydroxypropyl)propanediamine.

4. The catalyst composition according to claim 1, wherein the compound of the formula (1) is selected from the group consisting of N,N-dimethylethylenediamine, N,N-dimethylpropanediamine, N,N-dimethylbutanediamine, N,N-dimethylpentanediamine, N,N-dimethylneopentanediamine, N,N-dimethylhexanediamine, N-(aminoethyl)piperidine, 1-(aminopropyl)-2-methylimidazole, N,N-bis(dimethylaminopropyl)ethylenediamine and N,N-bis(dimethylaminopropyl)propanediamine, and the compound of the formula (2) is selected from the group consisting of N,N-dimethyl-N',N'-bis(hydroxyethyl)ethylenediamine, N,N-dimethyl-N',N'-bis(hydroxyethyl)propanediamine, N,N-dimethyl-N',N'-bis(hydroxyethyl)neopentanediamine, N,N-dimethyl-N',N'-bis(hydroxyethyl)hexanediamine, N-(N,N-bis(hydroxyethyl)aminoethyl)piperidine, N,N-bis(dimethylaminopropyl)-N',N'-bis(hydroxyethyl)ethylenediamine, N,N-bis(dimethylaminopropyl)-N',N'-bis(hydroxyethyl)propanediamine, N,N-dimethyl-N',N'-bis(hydroxypropyl)ethylenediamine, N,N-dimethyl-N',N'-bis(hydroxypropyl)propanediamine, N,N-dimethyl-N',N'-bis(hydroxypropyl)neopentanediamine, N,N-dimethyl-N',N'-bis(hydroxypropyl)hexanediamine, N-(N,N-bis(hydroxyethyl)aminoethyl)piperidine, N,N-bis(dimethylaminopropyl)-N',N'-bis(hydroxyethyl)ethylenediamine and N,N-bis(dimethylaminopropyl)-N',N'-bis(hydroxyethyl)propanediamine.

5. A method for producing a polyurethane resin, which comprises reacting a polyol with a polyisocyanate in the presence of a catalyst, a surfactant or a cross-linking agent, wherein the catalyst comprises an amine compound of the following formula (1):

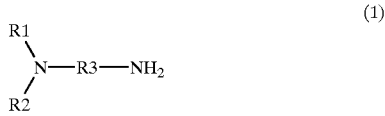

(1)

wherein each of R1 and R2 which are independent of each other, is a $C_{1-4}$ alkyl group, such alkyl groups bonded to each other directly or via a nitrogen atom or an oxygen atom to form a ring structure, a dimethylaminopropyl group or a diethylaminopropyl group, and R3 is a $C_{2-16}$ straight chain or branched chain alkylene group, and an amine compound of the following formula (2):

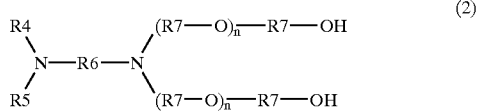

(2)

wherein each of R4 and R5 which are independent of each other, is a $C_{1-4}$ alkyl group, such alkyl groups bonded to each other directly or via a nitrogen atom or an oxygen atom to form a ring structure, a dimethylaminopropyl group or a diethylaminopropyl group, R6 is a $C_{2-16}$ straight chain or branched chain alkylene group, R7 is a $C_{2-3}$ straight chain or branched chain alkylene group, and n is an integer of from 0 to 2 wherein the amount of volatile catalyst is not more than 1μg per gram of the polyurethane resin product by the composition.

6. The method for producing a polyurethane resin according to claim 5, wherein in addition to the catalyst, at least one member selected from the group consisting of a blowing agent, a surfactant and a cross-linking agent is present in the reaction.

7. The method for producing a polyurethane resin according to claim 5 or 6, wherein the mixing ratio of the compound of the formula (1) to the compound of the formula (2) is within a range of 20 to 95/80 to 5 (wt %).

8. The method for producing a polyurethane resin according to claim 5 or 6, wherein the compound of the formula (1) is selected from the group consisting of N,N-dimethylethylenediamine, N,N-dimethylpropanediamine, N,N-dimethylbutanediamine, N,N-dimethylpentanediamine, N,N-dimethylneopentanediamine, N,N-dimethylhexanediamine, N,N-dimethylhexadecyldiamine, N,N-diethylethylenediamine, N,N-diethylpropanediamine, 4-amino-1-diethylaminopentane, N,N-diethylhexanediamine, N-(aminoethyl)piperidine, N-(aminoethyl)-N'-methylpiperazine, N-(aminoethyl)morpholine, N-(aminopropyl)piperidine, N-(aminopropyl)-N'-methylpiperazine, N-(aminopropyl)morpholine, N,N-bis(dimethylaminopropyl)ethylenediamine, N,N-bis(dimethylaminopropyl)propanediamine, and N,N-bis(diethylaminopropyl)propanediamine, and the compound of the formula (2) is selected from the group consisting of N,N-dimethyl-N',N'-bis(hydroxyethyl)ethylenediamine, N,N-dimethyl-N',N'-bis(hydroxyethyl)propanediamine, N,N-dimethyl-N',N'-bis(hydroxyethyl)neopentanediamine, N,N-dimethyl-N',N'-bis(hydroxyethyl)hexanediamine, N,N-dimethyl-N',N'-bis(hydroxyethyl)hexadecyldiamine, N,N-diethyl-N',N'-bis(hydroxyethyl)ethylenediamine, N,N-diethyl-N',N'-bis(hydroxyethyl)propanediamine, 4-bis(hydroxyethyl)amino-1-diethylaminopentane, N,N-diethyl-N',N'-bis(hydroxyethyl)hexanediamine, N-(N,N-bis(hydroxyethyl)aminoethyl)piperidine, N-(N,N-bis(hydroxyethyl)aminoethyl)-N'-methylpiperazine, N-(N,N-bis(hydroxyethyl)aminopropyl)piperidine, N-(N,N-bis(hydroxyethyl)aminopropyl)-N'-methylpiperazine, N,N-bis(dimethylaminopropyl)-N',N'-bis(hydroxyethyl)ethylenediamine, N,N-bis(dimethylaminopropyl)-N',N'-bis(hydroxyethyl )propanediamine, N,N-bis(diethylaminopropyl)-N',N'-bis(hydroxyethyl)propanediamine, N,N-dimethyl-N',N'-bis(hydroxypropyl)ethylenediamine, N,N-dimethyl-N',N'-bis(hydroxypropyl)propanediamine, N,N-dimethyl-N',N'-bis(hydroxypropyl)neopentanediamine, N,N-dimethyl-N',N'-bis(hydroxypropyl)hexanediamine, N,N-dimethyl-N',N'-bis(hydroxypropyl)hexadecyldiamine, N,N-diethyl-N',N'-bis(hydroxypropyl)ethylenediamine, N,N-diethyl-N',N'-bis(hydroxypropyl)propanediamine, 4-bis(hydroxypropyl)amino-1-diethylaminopentane, N,N-diethyl-N',N'-bis(hydroxypropyl)hexanediamine, N-(N,N-bis(hydroxypropyl)aminoethyl)piperidine, N-(N,N-bis(hydroxypropyl)aminoethyl)-N'-methylpiperazine, N-(N,N-bis(hydroxypropyl)aminopropyl)piperidine, N-(N,N-bis(hydroxypropyl)aminopropyl)-N'-methylpiperazine, N,N-bis(dimethylaminopropyl)-N',N'-bis(hydroxypropyl)ethylenediamine, N,N-bis(dimethylaminopropyl)-N',N'-bis(hydroxypropyl)propanediamine, and N,N-bis(diethylaminopropyl)-N',N'-bis(hydroxypropyl)propanediamine.

9. The method for producing a polyurethane resin according to claim 5 or 6, wherein the compound of the formula (1) is selected from the group consisting of N,N-dimethylethylenediamine, N,N-dimethylpropanediamine, N,N-dimethylbutanediamine, N,N-dimethylpentanediamine, N,N-dimethylneopentanediamine, N,N-dimethylhexanediamine, N-(aminoethyl)piperidine, 1-(aminopropyl)-2-methylimidazole, N,N-bis(dimethylaminopropyl)ethylenediamine and N,N-bis(dimethylaminopropyl)propanediamine, and the compound of the formula (2) is selected from the group consisting of N,N-dimethyl-N',N'-bis(hydroxyethyl)ethylenediamine, N,N-dimethyl-N',N'-bis(hydroxyethyl)propanediamine, N,N-dimethyl-N',N'-bis(hydroxyethyl)neopentanediamine, N,N-dimethyl-N',N'-bis(hydroxyethyl)hexanediamine, N-(N,N-bis(hydroxyethyl)aminoethyl)piperidine, N,N-bis(dimethylaminopropyl)-N',N'-bis(hydroxyethyl)ethylenediamine, N,N-bis(dimethylaminopropyl)-N',N'-bis(hydroxyethyl)propanediamine, N,N-dimethyl-N',N'-bis(hydroxypropyl)ethylenediamine, N,N-dimethyl-N',N'-bis(hydroxypropyl)propanediamine, N,N-dimethyl-N',N'-bis(hydroxypropyl)neopentanediamine, N,N-dimethyl-N',N'-bis(hydroxypropyl)hexanediamine, N-(N,N-bis(hydroxyethyl)aminoethyl)piperidine, N,N-bis(dimethylaminopropyl)-N',N'-bis(hydroxyethyl)ethylenediamine and N,N-bis(dimethylaminopropyl)-N',N'-bis(hydroxyethyl)propanediamine.

10. The method for producing a polyurethane resin according to claim 6, wherein the blowing agent is water and/or a low boiling point organic compound is used.

11. The method for producing a polyurethane resin according to claim 6, wherein the polyurethane resin is a soft polyurethane foam.

12. A polyurethane resin which is obtained by the method as defined in claim 5 or 6, whereby the total amount of the amine catalyst generated in a gas form from the polyurethane resin when the polyurethane resin is heated at 100° C. for 48 hours, is not more than 1μg per gram of the polyurethane resin.

13. A catalyst composition for the production of a polyurethane resin which comprises (1) N,N-dimethylethylenediamine (DMAEA) or N,N-dimethylpropanediamine (DMAPA) and (2) N,N-dimethyl-N',N'-bis(hydroxyethyl) propanenediamine (DMAPAZED) or N,N-dimethyl-N',N'-bis(hydroxypropyl) propanediamine (DMAPA2PO), wherein the ratio of (1) to (2) is within a range of 30–90/70–10% by weight.

14. A method for producing a polyurethane resin, which comprises reacting a polyol with a polyisocyanate in the presence of a catalyst, a surfactant or a cross-linking agent, wherein the catalyst comprises the catalyst composition which comprises (1) N,N-dimethylethylenediamine (DMAEA) or N,N-dimethylpropanediamine (DMAPA) and (2) N,N-dimethyl-N',N'-bis(hydroxyethyl) propanenediamine (DMAPAZED) or N,N-dimethyl-N',N'-bis(hydroxypropyl) propanediamine (DMAPA2PO), wherein the ratio of (1) to (2) is within a range of 30–90/70–10% by weight.

* * * * *